(12) United States Patent
Kersten

(10) Patent No.: US 6,468,013 B1
(45) Date of Patent: Oct. 22, 2002

(54) BOLT APPARATUS FOR CALCULATING THREADED BOLT TENSION AND METHOD OF MANUFACTURE

(75) Inventor: Ferdinand Kersten, Gemert (NL)

(73) Assignee: Koninklijke Nedschoref Holding N.V. (NL)

( * ) Notice: Subject to any disclaimer, the term of this patent is extended or adjusted under 35 U.S.C. 154(b) by 0 days.

(21) Appl. No.: 09/489,802

(22) Filed: Jan. 24, 2000

(51) Int. Cl.[7] ................................................ F16B 25/00
(52) U.S. Cl. ...................................................... 411/386
(58) Field of Search ................................ 411/386, 411, 411/426

(56) References Cited

U.S. PATENT DOCUMENTS

| | | | |
|---|---|---|---|
| 2,167,910 A | * | 8/1939 | Rottenberg |
| 3,439,575 A | * | 4/1969 | Gifford |
| 3,829,163 A | * | 8/1974 | Hans |
| 4,789,288 A | * | 12/1988 | Peterson |
| 4,915,560 A | * | 4/1990 | Peterson |
| 5,064,327 A | * | 11/1991 | Hughes |
| 5,073,073 A | * | 12/1991 | Kazino |
| 5,352,065 A | | 10/1994 | Arnall et al. |
| 5,419,667 A | * | 5/1995 | Avgoustis |

FOREIGN PATENT DOCUMENTS

| | | |
|---|---|---|
| EP | 0 459 365 A1 | 5/1991 |
| EP | 0 759 333 A1 | 8/1996 |
| WO | WO 97/44644 | 11/1997 |

* cited by examiner

*Primary Examiner*—Flemming Saether
(74) *Attorney, Agent, or Firm*—Thomas, Kayden, Horstemeyer & Risley LLP

(57) ABSTRACT

Threaded bolt having a distal insertion end and a proximal head-end and a threaded shank extending In between, said shank having a longitudinal axis, wherein the distal insertion end comprises a first distal portion that comprises the outermost distal end of the distal insertion end, said outermoat distal end being eccentrically located with respect to the central axis of the shank, the first distal portion defining a circumferentially continuous, smooth, non-threaded surface, in which a second distal portion, in proximal direction, connects to said first distal portion, said second distal portion defining a circumferentially continuous, smooth, non-threaded, right-circular cylindrical surface, which is located centrically with respect to the central axis of the shank, wherein the first distal portion has been provided with surfaces, the generatrix of which has a straight course and is inclined with respect to the longitudinal axis.

26 Claims, 6 Drawing Sheets

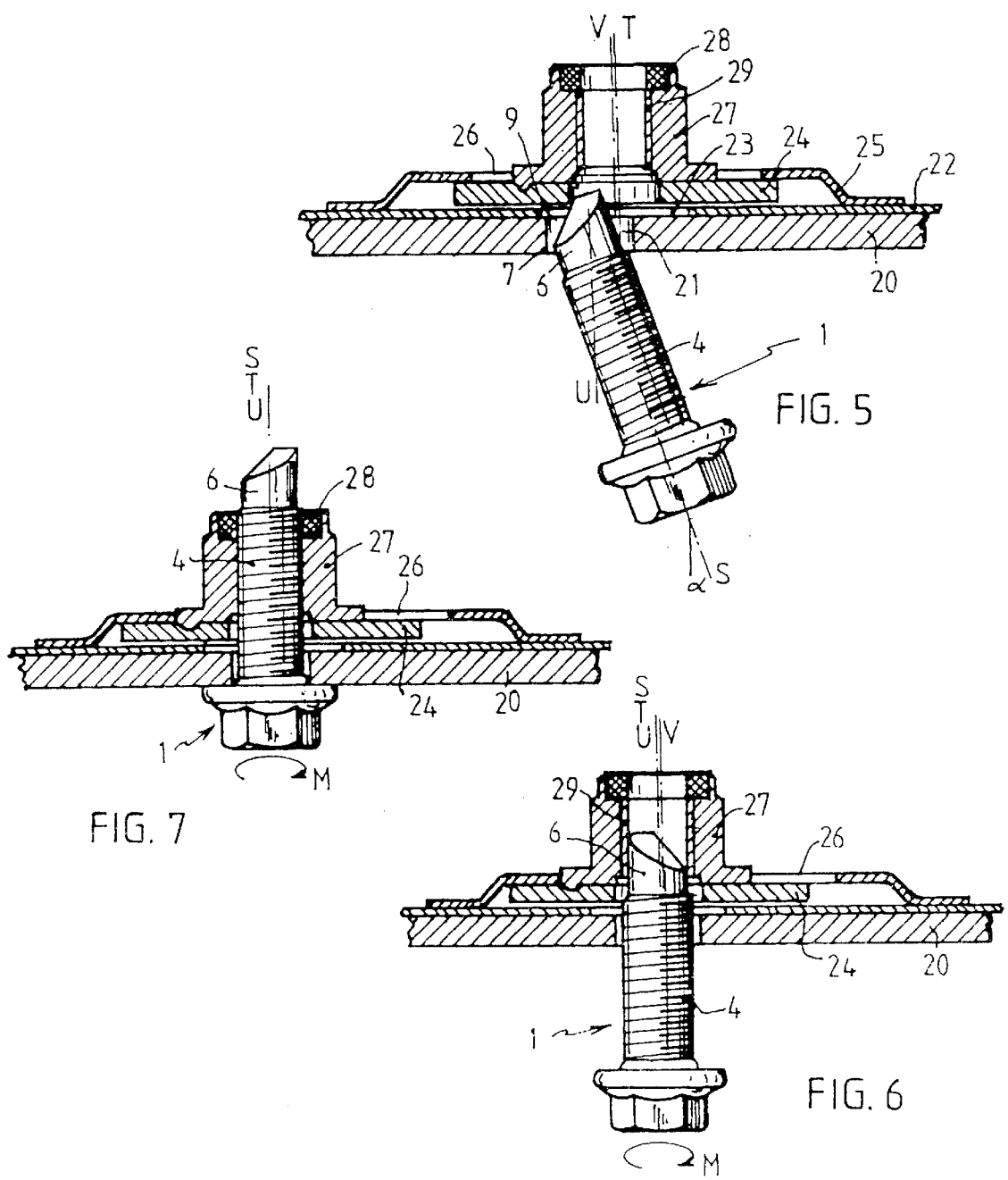

BOLT APPARATUS FOR CALCULATING THREADED BOLT TENSION AND METHOD OF MANUFACTURE

CROSS-REFERENCE TO RELATED APPLICATIONS

This application claims priority to Netherlands patent application no. 1011591, filed Mar. 18, 1999, and Netherlands patent application no. 1014143, filed Jan. 21, 2000.

FIELD OF THE INVENTION

The invention relates to a threaded bolt.

BACKGROUND OF THE INVENTION

A threaded bolt is known from U.S. Pat. No. 4,952,110. This threaded bolt is provided with an eccentric tip with a smooth portion and a threaded portion, located opposite each other. The threaded portion of the eccentric tip is located on the surfaces that are substantially aligned with the threaded surfaces of the shank of the threaded bolt. The smooth surfaces are located at the areas of the tip that are radially inwardly shifted with respect to the threaded surfaces of the shank.

In the known threaded bolt, the eccentric arrangement of the tip also provides a means for axial alignment of the central axis of the threaded bolt and the central axis of the nut or tapped hole. The threaded side of the tip helps to prevent an inclined position ("cross-threads") of the threaded bolt.

Cross-threading occurs when a threaded bolt, especially in the automobile industry, does not precisely, or with a deviation of more than 5° with respect to the perpendicular direction of insertion, fit in a nut or tapped hole. Such a form of cross-threading is also called angular deviation.

From U.S. Pat. No. 4.981.406 a threaded bolt is known with a threaded shank and a tip that may be threaded on one side and may be smooth on the other side, possibly with inwardly shifted areas, and the central axis of which is at an angle with or parallel, yet staggered, to the central axis of the shank.

From the European patent application 0.475.712 a threaded bolt is known with a threaded shank and with a tip, the surface of which, on one side, forms a continuation of the thread of the shank and, on the other side, is smooth and is tapered in distal direction.

All the cited, known threaded bolts have the disadvantage that, although they provide a certain degree of alignment, the threaded portion on the tip results in a destruction of the thread of the nut or tapped hole when the insertion position of the threaded bolt is too oblique. It has to be kept in mind here that, especially in the automobile industry, robots are used to screw the threaded bolts in the appropriate holes with a predetermined turning moment. This means that, independent of the situation the threaded bolt that is to be screwed in encounters, the threaded bolt is rotated in until the required tightening moment, which, if the thread has an incorrect position with respect to the screw hole, may result in an unacceptable degree of deformation of either of the threads when they interact. The connection in question will then not be as it should be, as a result of which, after this has been ascertained, the connection will either have to be repaired, causing loss of time, or a certain degree of danger will have been created for the period during which the end product, particularly a motor-car, is used.

Other known threaded bolts have a tip that is provided with a circumferential thread that forms a continuation of the thread of the shank, yet wherein the tip is centrically tapered. Such threaded bolts are not given preference because a tip like that is difficult to manufacture, while, in addition, the effect with respect to the realization of the alignment of the central axis of nut or tapped hole and threaded bolt is very limited.

Another known threaded bolt has a threaded shank that is provided with a truncated conically shaped, centric, smooth head, in which a circular cylinder portion is provided between the smooth head and the shank, which circular cylinder portion is also smooth and has a diameter that is smaller than the inner diameter of the thread on the shank. The aligning function of this bolt, too, leaves much to be desired.

Another, similar threaded bolt has a truncated conically shaped, centric, smooth head with a convex generatrix and, in proximal direction, connecting smooth, circular cylinder-shaped surfaces, the diameter of which substantially corresponds to the inner diameter of the threaded shank.

In the automotive industry, in particular, it is becoming more and more difficult to attune the parts that have to be assembled in such a way that they precisely coincide at their several points of attachment. It may occur that certain parts have to be fastened to one another at as many as five or six places with the aid of threaded bolt connections. If the high cost involved with accurate attuning, and, consequently, a minimizing of the tolerances, is to be avoided, measures will have to be taken with which deviations can be levelled out. Nowadays, for this purpose case nuts (floating nuts) are used that are located on a plate member that has to be fastened, with their screw hole behind the relatively large hole of that one plate that has to be fastened. In accordance with the dimensions of the slotted hole, said case nuts have a freedom of movement that is limited by retainers welded to that one plate that has to be fastened. Owing to the necessary freedom of position of said case nuts, these will often not be in alignment with the fastening holes of the other part/plate that has to be fastened.

An improved threaded bolt is disclosed in European patent 0.832.363 in the name of assignee. This known threaded bolt provides a solution to many of the above-mentioned problems.

U.S. Pat. No. 5.073.073 discloses a threaded bolt having a smooth distal end comprising a right-circular cylindrical distal portion located offset with respect to the shank central axis and a truncated portion located between said distal portion and the threaded shank.

It is also known to provide a threaded bolt with measurement planes by arranging measurement planes at a recess or an elevation with respect to the actual end planes at both the head end and at the insertion end by means of cold deformation. The presence of several radial planes, situated at different axial distances measured along the centre line of the threaded bolt, however, has a detrimental influence on the recognizability and the clearness of the measurement results. This threaded bolt is described in European patent application 0.459.365, the contents of which should be considered inserted here by reference.

Another proposal is known from U.S. Pat. No. 4.846.001, in which a threaded bolt is shown of which the head is provided with a recess with a measurement plane in it, which by finishing has been made sufficiently smooth/level, in order to be used in ultrasonic measuring. The recess is used for accommodating a piezo-electric sensor. In another embodiment the recess is absent and the sensor is placed at the end plane at the head.

There is still a need, however, for a further improved threaded bolt with which, even under the above circumstances, alignment can be guaranteed, and cross-threading is prevented in addition, and which therefore has a practically maximum capacity to align the central axes of holes and threaded bolt, as well as an improved optimal capacity for correcting oblique positions of insertion of the threaded bolt.

SUMMARY OF THE INVENTION

For this purpose, the invention provides a threaded bolt having a distal insertion end and a proximal head-end and a threaded shank extending in between, said shank having a longitudinal axis, wherein the distal insertion end comprises a first distal portion that comprises the outermost distal end of the distal insertion end, said outermost distal end being eccentrically located with respect to the central axis of the shank, the first distal portion defining a circumferentially continuous, smooth, non-threaded surface, in which a second distal portion, in proximal direction, connects to said first distal portion, said second distal portion defining a circumferentially continuous, smooth, non-threaded, right-circular cylindrical surface, which is located centrically with respect to the central axis of the shank, wherein the first distal portion has been provided with surfaces, the generatrix of which has a straight course and is inclined with respect to the longitudinal axis.

Preferably, said surfaces of said first distal portion form part of a conical surface, preferably of a same conical surface.

As a result, the threaded bolt according to the invention, owing to the eccentric location of the -at least partly- frusto-conical (truncated-conical) tip, possesses a great capacity for smooth alignment, without there being a chance that the threaded bolt will be damaged when in an oblique position. The alignment procedure will then not be disturbed by a thread. The capacity for alignment is increased, while, when the threaded bolt is being screwed in, the function of the smooth tip of opposing an oblique position, is smoothly taken over by the cylindrical smooth surfaces that, in proximal direction, lie there behind. As a result, even in cases of large deviations in size, the threads only mesh when the threaded bolt is in an at least substantially perpendicular position to the screw hole, and the robot that tightens the threaded bolt can screw in with the set torque without running the risk of deformation or destruction of the thread. Because of the shape of the distal insertion end, not only is the alignment function enhanced, but the function of correcting oblique positions as well. The transition from the first distal portion to the second distal portion is less abrupt than in the aforementioned known threaded bolt.

Preferably, said generatrix and the shank longitudinal axis include an angle within the range of 30 to 60 degrees, more preferably an angle of about 45 degrees.

Preferably, said conical surface has a central axis extending parallel to said shank longitudinal axis. Preferably, said central axis of said conical surface is spaced from said shank longitudinal axis. Preferably, said central axis is spaced from the cylindrical surface of said second distal portion in a direction perpendicular to said shank longitudinal direction.

In a further development of the threaded bolt of the invention, said conical surfaces form part of a truncated cone, said outermost distal end being formed by an end plane. Preferably, said end plane extends perpendicular to said shank longitudinal axis. Preferably, said end plane is circular.

Preferably, in distal end view the boundary of said end plane coincides at least in one location with the boundary of said cylindrical surface of said second distal portion.

Alternatively, in distal end view the boundary of said end plane may be radially inwardly spaced from the boundary of said cylindrical surface of said second distal portion.

In a further development of the threaded bolt according to the invention said second distal portion has a diameter that is larger than the inner diameter of the groove of the thread on the shank and smaller than the outer diameter of the groove of the thread on the shank. Hereby the anti-cross threading properties are still further improved, due to the precise -but still permitting insertion of the bolt- fitting of the second distal portion in the nut.

Preferably, said outermost distal end is entirely located on one side of the central axis of the shank. This causes the alignment function of the threaded bolt according to the invention to be maximized. This is enhanced even more when the eccentricity of the outermost distal end is equal to at least one fourth of the diameter of the shank.

Preferably, said eccentricity of the outermost distal end is equal to at least one fourth of the diameter of the shank.

Preferably, said first distal portion, at least at one side thereof, has surface areas of which the generatrix coincides with the generatrix of surfaces of the threaded bolt lying in front of them in proximal direction. This guarantees a smooth transition.

Preferably, said second distal portion connects to the thread of the shank in proximal direction.

Preferably, said thread of the shank, in the area near the distal portion, is locally interrupted and in which the shank in the same area has been provided with a recess.

The invention moreover relates to a threaded bolt provided with measurement planes for use in ultrasonic length measurement. After the threaded bolt has been fixed in a connection, such a measurement is performed to determine the length change of the threaded bolt, in order to find out the tension within the threaded bolt in that way.

In this respect, in the above described threaded bolt of the invention a first measurement plane extending perpendicular to said shank longitudinal axis has been formed on said proximal head end, said end plane being formed as a second measurement plane extending parallel to said first measurement plane, said first and said second measurement planes being for use in ultrasonic length measurement for determining the tension in the threaded bolt after it has been placed in a connection.

Preferably, said first and said second measurement planes have a plane parallelism of at least 0.05 mm.

Preferably, said first measurement plane is located concentric with respect to said shank longitudinal axis and said second measurement plane is located eccentric with respect to said shank longitudinal axis.

Preferably, said first measurement plane at the head end is located recessed.

It has been established that even if said second measurement plane is located radially aside of said shank longitudinal axis, useful measurements can be carried out.

It is another object of the invention to provide a threaded bolt, which can easily be manufactured or is manufactured and able to provide reliable measurement results. The invention further provides a method for making such a threaded bolt.

From one aspect the invention to that end provides a threaded bolt having a proximal head end and a distal insertion end, the head end and the insertion end being provided with measurement planes for use in ultrasonic length measurement for determining the tension in the threaded bolt after it has been placed in a connection, in which the measurement plane at the insertion end forms the complete end plane there and which has been arranged on the insertion end without final (or as it is called in the art "second") processing operation.

Preferably, said measurement planes have a plane parallelism of at least 0,05 mm.

Preferably the measurement plane has been arranged at the insertion end by means of an heading treatment.

Said heading treatment can advantageously be performed during an heading treatment performed in a bolt machine, also known as "bolt maker". In such a bolt machine the heading of the head takes place in one operation. During said heading the measurement planes can be realized at both ends, in which the exact axial distance between both measurement planes can be determined.

Alternatively the heading operation for making the measurement planes may take place during the subsequent shank reduction.

By way of a further alternative instead of by means of heading, the measurement plane at the insertion end can indeed be made in the same bolt machine, but then in a following station, where the point is made. This then takes place by means of a machining treatment.

BRIEF DESCRIPTION OF THE DRAWINGS

The invention will now be elucidated on the basis of the examples shown in the attached drawings, in which:

FIG. 5 shows the threaded bolt of FIG. 1 (with a shorter thread, however) while being screwed into a nut in an unforeseen oblique position, in which the holes of the parts that are to be fastened are not in alignment with one another;

FIG. 6 shows the threaded bolt of FIG. 1 in the fastening stage, following the stage depicted in FIG. 5;

FIG. 7 shows the threaded bolt in the phase in which the threads are meshed;

DETAILED DESCRIPTION

Figure 1:
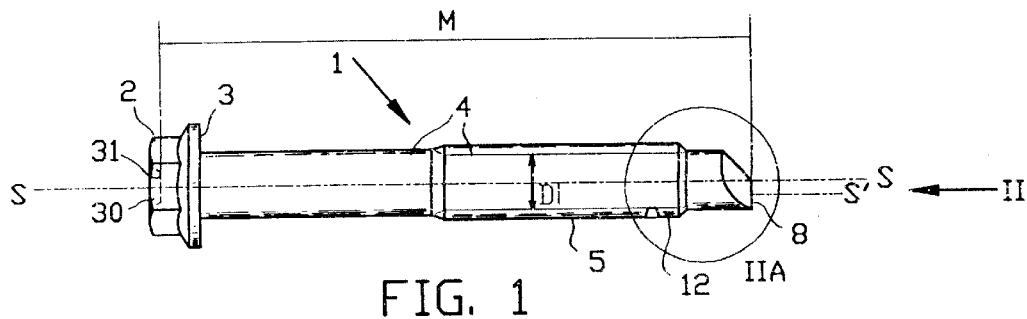
FIG. 1 shows a first embodiment of a threaded bolt according to the invention, viewed from the side.
Figures 2, 2A:
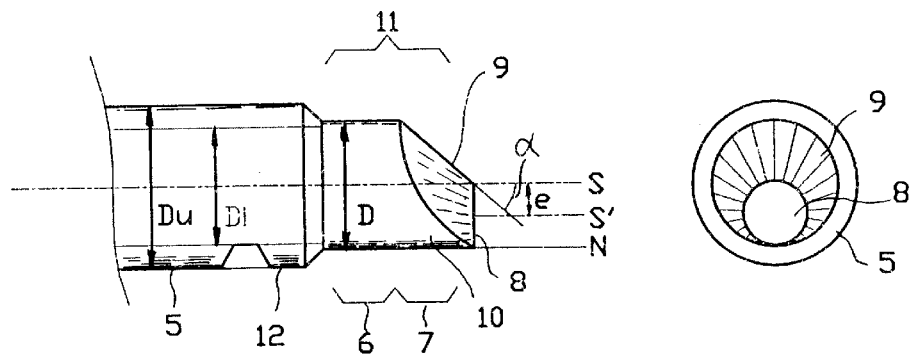
FIG. 2 shows a distal end view on the bolt of FIG. 1.
FIG. 2A shows the insertion end of the bolt of FIG. 1 on a larger scale.

In FIGS. 1, 2, 2A the threaded bolt is depicted that is provided with a hexagonal head 2, a stop flange 3, a shank 4 that is provided with a thread 5, and a distal end 11 that comprises a first distal portion 7 and a second distal portion 6 and a transverse distal end surface 8. The second distal portion 6 is right-circular cylindrically shaped and smooth and, in distal direction, smoothly passes over into the first distal portion 7, which, as seen in the drawing, at its lower side forms a straight continuation of the second distal portion 6, yet forms conical surfaces 9 in the areas lying thereabove. The conical surfaces 9 have a common axis S' extending parallel to axis S. The circular end surface 8 is located on one side of the central axis S—S of the shank 4, as a result of which the eccentricity e amounts to at least ¼ Di (the inner diameter of the thread).

The diameter D of the of the second distal portion 6 is a little smaller than the outside diameter Du of the thread 5 and a little larger than the inside diameter Di of the thread 5.

The head 2 of the bolt 1 is provided with a recess 30 having a smooth, even bottom plane 31 which is suitable for being used as measurement plane in case of ultrasonic length measurements on the bolt 1. Likewise, the end surface 8 is smooth and even, for the same purpose. Both surfaces 8 and 31 are perpendicular to axis S and have a plane parallelism of about 0,05 mm. As will be explained below, by ultrasonic measurements the distance M between surfaces 8 and 31 is established after the bolt has been threaded in its connection in order to calculate the tension in the bolt.

In the thread portion 5 the shank 4 is provided with a notch 12 that is intended to accommodate welding or paint residue that has remained behind in the thread of the nut or tapped hole. In this way this residue can have no detrimental effect on the insertion of the threaded bolt.

The threaded bolt 1, 101 can be manufactured in a simple way by subsequently cutting off a bar to the exact length, butting the head, forming the tip by means of machining, and rolling the thread. The conical surface 9 has been made by using a cutting blade that is held inclined with respect to the shank longitudinal axis S, that is concentric with the axis S'.

Figure 3:
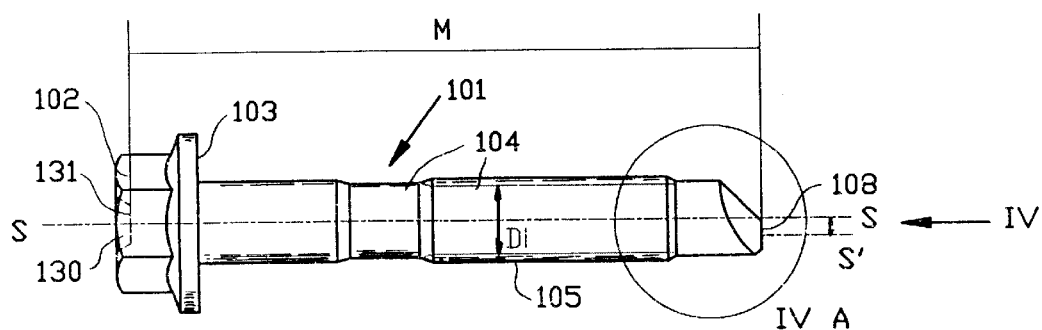
FIG. 3 shows a second embodiment of a threaded bolt according to the invention, viewed from the side.
Figures 4, 4A:
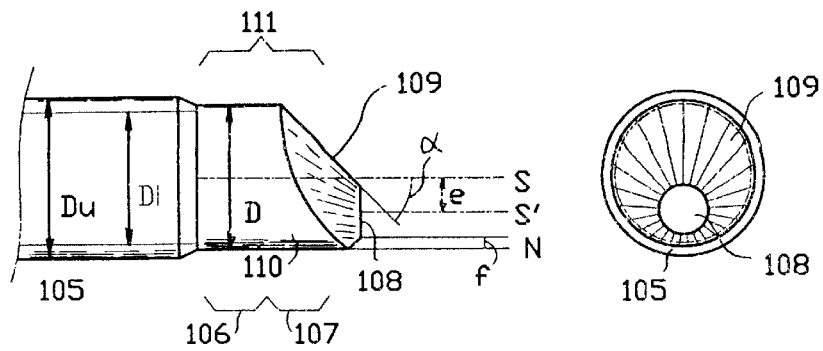
FIG. 4 shows a distal end view on the bolt of FIG. 3.
FIG. 4A shows the insertion end of the bolt of FIG. 1 on a larger scale.

In doing so, the eccentricity may be selected in accordance with the intended application. This can be seen when comparing the embodiments of FIGS. 1–2A on the one hand and of FIGS. 3–4A on the other hand. FIGS. 3, 4 and 4A show a threaded bolt having an almost similar insertion end. Like or substantially corresponding portions or parts have like reference numerals increased by 100. As can be seen in FIG. 4, on one side the circular end surface 108 is located at a small distance f from the cylindrical surface 106, 107, so that the conical surface 109 extends continuously around the bolt, although with varying height. In contrast to this, in the embodiment of FIGS. 1, 2, 2A, the tangent of the circular end surface 8 and the tangent of the surface 10 are in the same plane T at a location on their lower side, considered as depicted in the drawings. At that very location (a line), the generatrix is parallel to the axis S.

The generatrix of the conical surfaces 9, 109 makes an angle α with the longitudinal axis S (and axis S'). In this embodiment, this angle is within the range of 30–60 degrees, in particular about 45 degrees.

During insertion, the smooth, eccentric tip seeks for the consecutive fastening holes and the nut or tapped hole and, during rotation, provides alignment, and the smooth cylinder housing provides an, at least approximately, straight position of the shank, in which cross-threading is prevented and the holes are precisely aligned. The lengths of the first and second distal portion will here be adapted to the thickness of the parts that have to be fastened.

In FIG. 5 the threaded bolt 1 is depicted during the beginning of the fastening operation. The threaded bolt, in cooperation with nut 27, is meant to connect plate 20 (of the chassis beam of a motor car) and plate 22 (of a box profile of a car body) to each other. The nut 27 is of the type "Nylock", and is provided with a nylon locking ring. The nut 27 is welded at its bottom end, as seen in the drawing, to case nut 24. The case nut 24 lies on the plate 22 and is limited in its free movement along said plate by the circumferential retainer 25, which is welded to the plate 22 itself.

After having placed the plates 20 and 22 against one another, they will be fastened to one another at several places. As has already been indicated above, at the last fastenings it will easily occur that the fastening holes 21, 23, 29 are not aligned. To this end, instead of a stationary nut or tapped hole, so-called swimming nuts are used, like the depicted nut assembly 27, 24, which is freely slidable within fixed retaining ring 25.

In the situation depicted in FIG. 5, the central axis U of fixing hole 21 of chassis beam 20 is neither aligned with the central axis V of fastening hole 23, which has already been enlarged, of the plate 22 of the box profile of a motor car body, nor with central axis T of the bore 29 of the nut assembly 27, 24.

With the aid of a non-depicted robot arm the threaded bolt 1 arrives at an angle α of for instance 20° with respect to the central axis U of the fastening hole 21. During insertion the eccentric tip 7, with the conical, preferably frusto-conical surface 9, in cooperation with the bore of case nut 24, possibly during rotation in the direction M of the threaded bolt 1 and in cooperation with the backwards portion of distal end 11 with the bore 21, brings about displacement of the case nut, and with that, also of the nut 27 to the left, as seen in the drawing. The farther the first distal portion 7 is displaced into the holes, the more the central axes T and U will be aligned with each other. The smooth second distal portion 6 will then, in cooperation with the limitation of the bore 21 and particularly in cooperation with the consecutive portions of the bore 29, bring about tilting of the threaded bolt 1 to a position in which the central axis S substantially coincides with central axis U and coincides with central axis T, as depicted in FIG. 4. Then the threaded bolt will be practically perfectly positioned with respect to the nut 27 and the threaded bolt 1 can then be screwed in further by rotation in the direction M until a tight clamping action between threaded bolt and nut 29 is effectuated and the situation as depicted in FIG. 5 has been achieved. The almost precise fitting of the cylindrical portion 6 into the passage in the nut 27 promotes the above described operation.

Figure 8A:
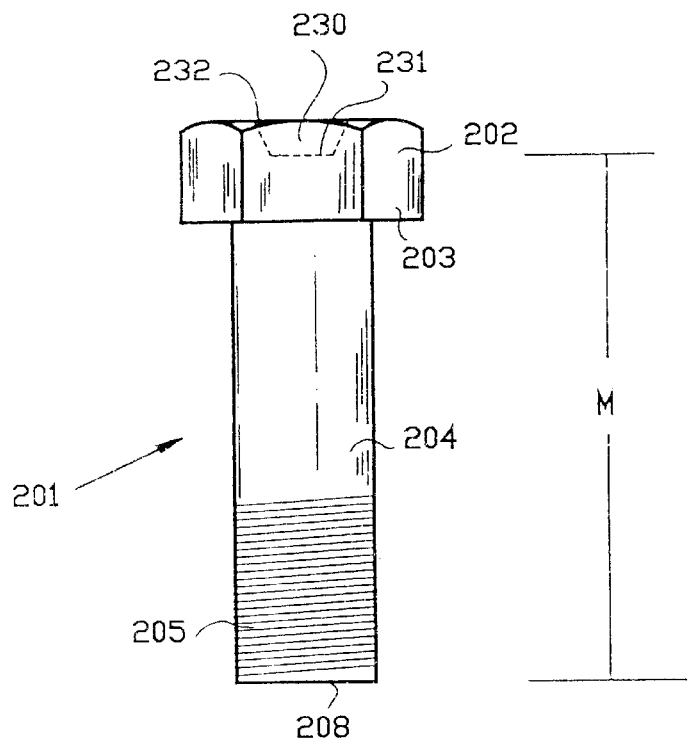
FIGS. 8A and 8B show two exemplary embodiments of the threaded bolt according to the invention.

The threaded bolt 201 in FIG. 8A (like portions or parts have like reference numerals increased by 100) comprises a shank 204 and a widened head 202 and an insertion end, a thread 205 being arranged at the distal portion of the shank 204. The end plane 208 of the distal insertion end is level to such an extent, that it can serve as measurement plane in ultrasonic measurements.

At the other end, in the head 202, with respect to the end plane 232, a recess 230 has been arranged of which the bottom plane 231 is also suitable to serve as measurement plane in ultrasonic measurements. The distance M, measured in axial direction from the threaded bolt, between the planes 208 and 231 is known exactly and realised in a positive manner.

Figure 8B:
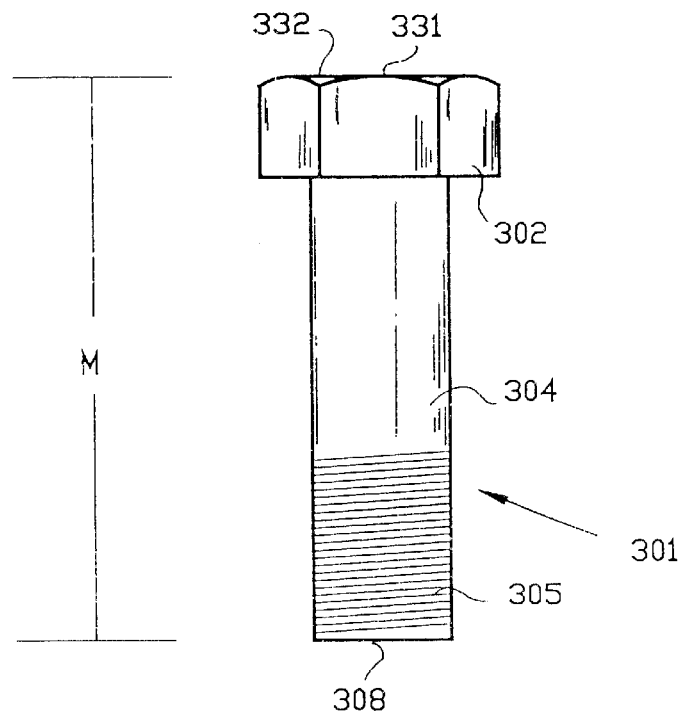

In FIG. 8B an alternative threaded bolt 301 is shown, in which the same parts have the same reference numbers, again increased by 100. The measurement plane 331 in the head 302, however, now also form the end plane 332 at that side. In the threaded bolts 201 and 301 the measurement plane 208 and 308, respectively, extends over at least almost the entire diameter of the insertion end.

Figure 9A:
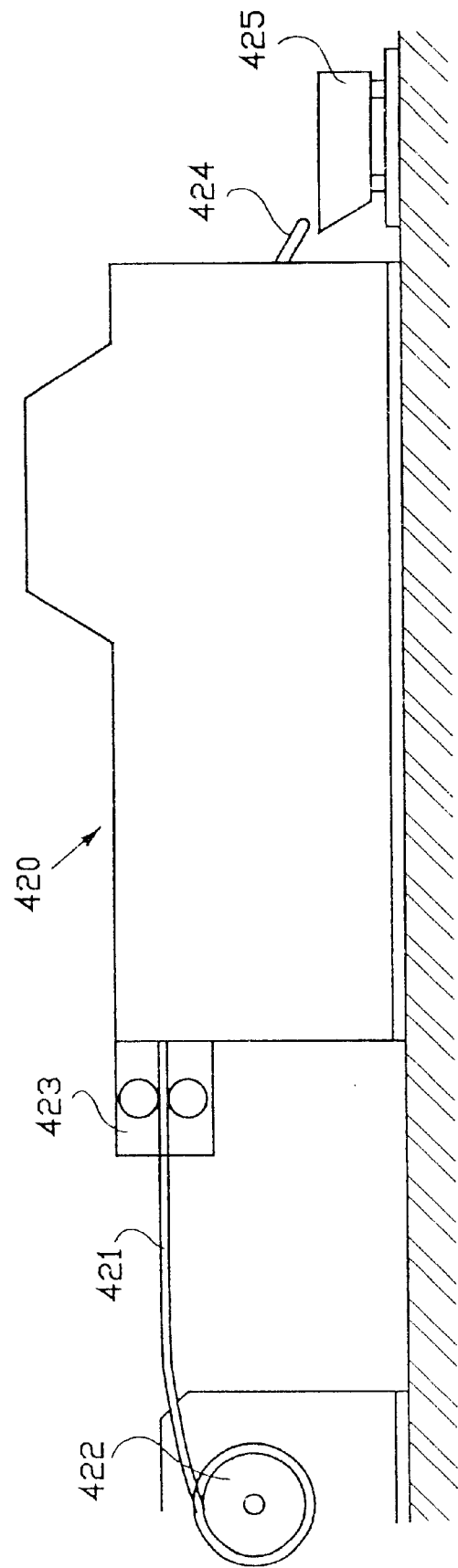
FIG. 9A shows a view on a bolt machine for manufacturing the threaded bolt according to the invention.

In FIG. 9A the bolt machine is shown, with which bolts of FIGS. 8A and 8B and alternative embodiments can be made. The thread 421 supplied from a roll 422, extends through the supply end 423 of the bolt machine 420 and is processed in there into threaded bolts, which have been provided with the measurement planes according to the invention and are discharged at the discharge end 424, where they are collected in tray 425.

Figure 9B:
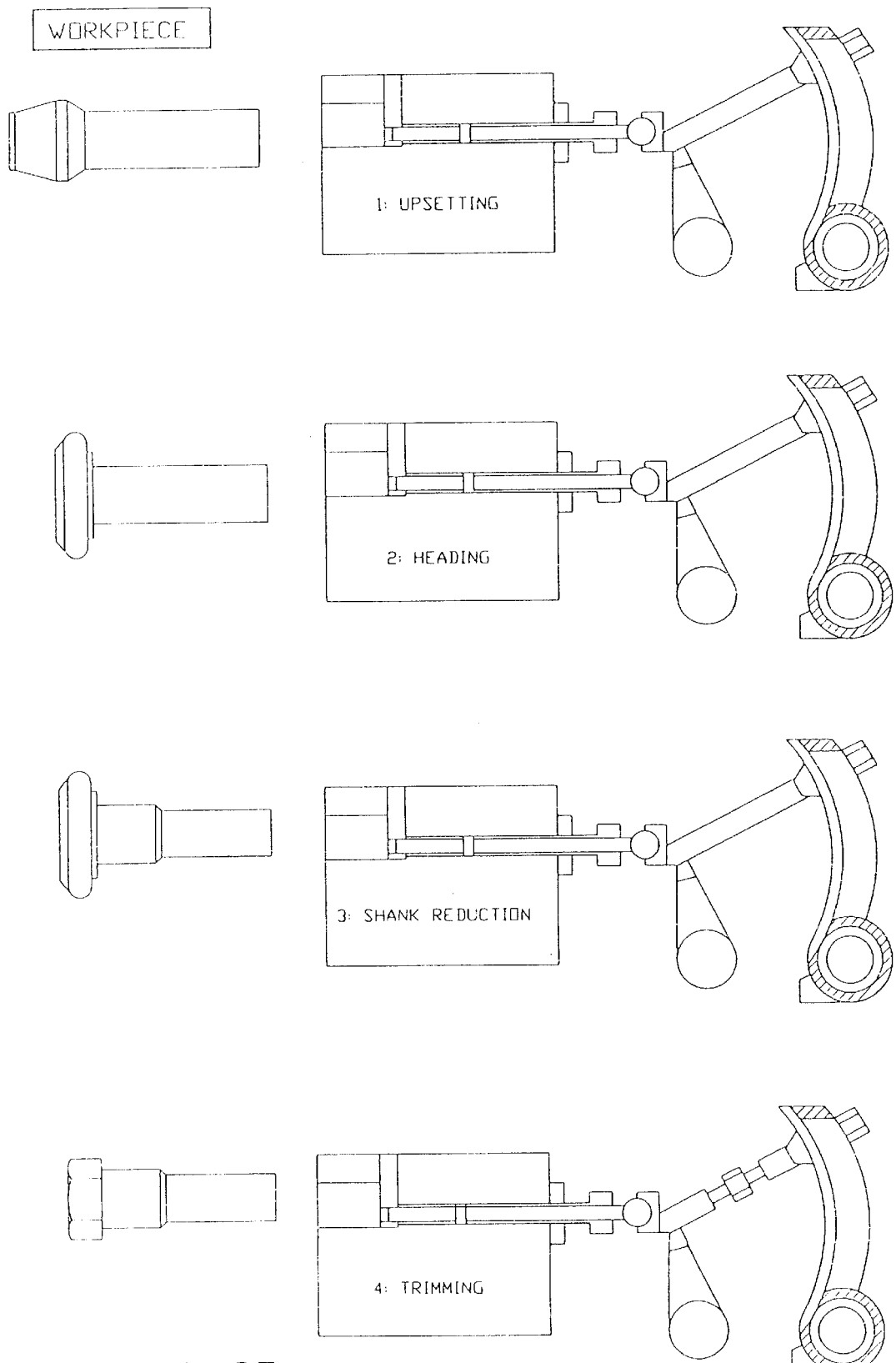
FIG. 9B shows consecutive stations within the bolt machine of FIG. 9A.
Figure 10:
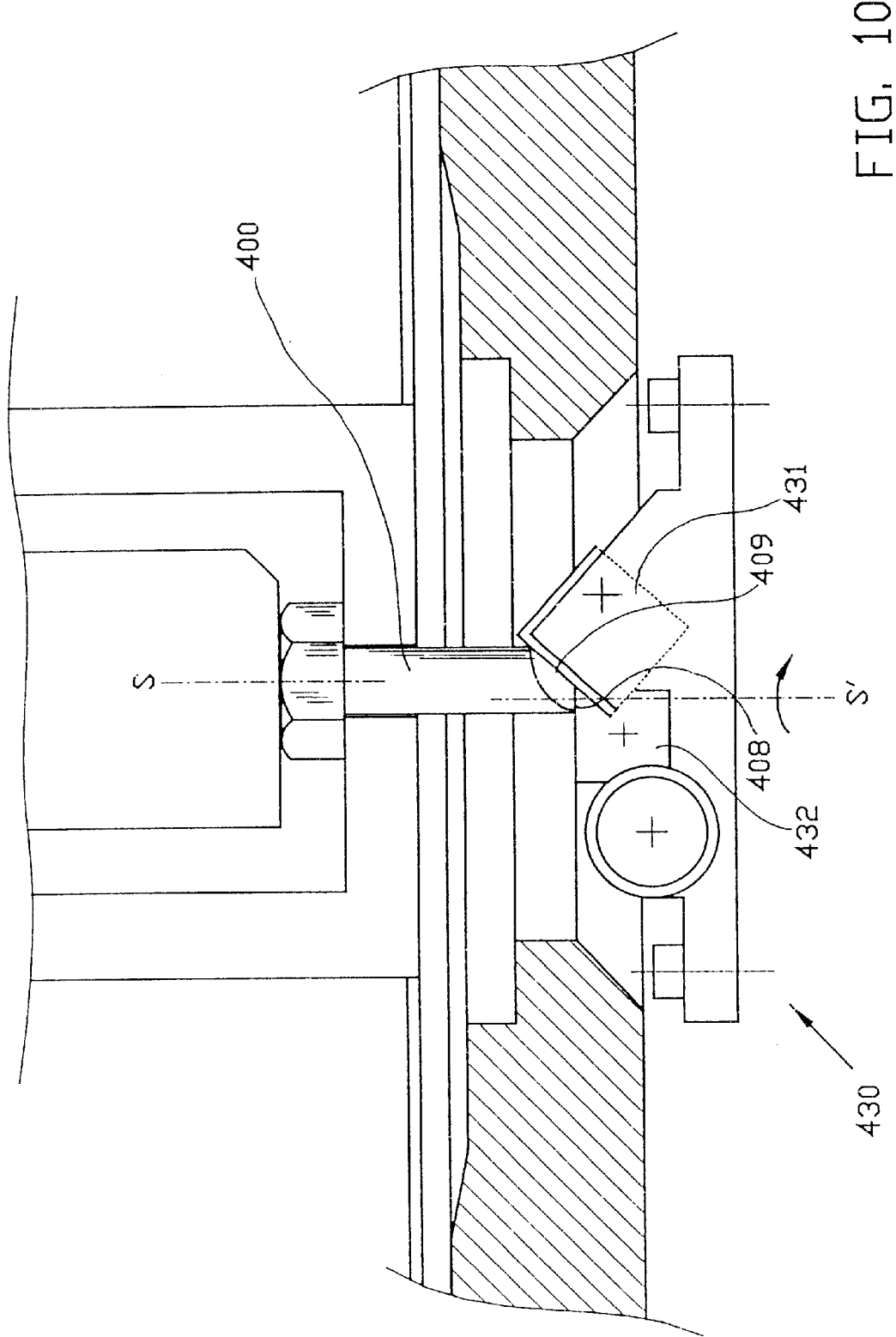
FIG. 10 shows a possible embodiment of the point-making machine accommodated in the bolt machine according to FIG. 9B.

In the bolt machine 420 there are (see FIG. 9B) a thread cutter, for cutting the workpieces 400 at a bolt length, subsequently a station 401 for upsetting, after that a station 402 for heading, followed by a station 403 for reducing the shank and then a station 404 for trimming.

The pieces thus obtained are subsequently subjected to a point-making treatment, in a point-making machine accommodated in bolt machine 420, and after that to a thread rolling treatment in the same bolt machine 420.

The measurement planes can be arranged during heading with the help of cold deformation, in station 402, either by integrally forming a recess in the head or not. During this heading use is made of the push-out pin 425, accommodated in station 402. For making the measurement plane at the insertion end the push-out pin in station 403 can also be used.

Thus without particular further provisions a threaded bolt can be realised having measurement planes which are suitable for ultrasonic measurements.

The point-making machine 430, accommodated in the bolt machine 420, can alternatively be used for making the measurement plane which is formed by the end plane itself of the insertion end. As can be seen two cutter plates have been arranged, which are hingeable and can be adjusted. The cutter plate 431 is positioned inclined and the cutter plate 432 horizontally, to cut the measurement plane. Here again the exact distance between both the measurement/end planes is known. Both cutter plates are rotated about the insertion end, whereas the bolt is held against rotation.

What is claimed is:

1. Threaded bolt having a distal insertion end and a proximal head-end and a threaded shank extending in between, said shank having a longitudinal axis, wherein the distal insertion end comprises a first distal portion that comprises the outermost distal and of the distal insertion end, said outer-most distal end being eccentrically located with respect to the central axis of the shank, the first distal portion defining a circumferentially continuous, smooth, non-threaded surface, in which a second distal portion, in proximal direction, connects to said first distal portion, said second distal portion defining a circumferentially continuous, smooth, non-threaded, right-circular cylindrical surface, which is located centrically with respect to the central axis of the shank, wherein the first distal portion has been provided with surfaces, the generatrix of which has a straight course and is inclined with respect to the longitudinal axis.

2. Threaded bolt according to claim 1, wherein said surfaces of said first distal portion form part of a conical surface.

3. Threaded bolt according to claim 2, wherein said surfaces of said first distal portion form part of one conical surface.

4. Threaded bolt according to claim 3, wherein said conical surface has a central axis extending in the same direction as said shank longitudinal axis.

5. Threaded bolt according to claim 4, wherein said central axis of said conical surface is spaced from said shank longitudinal axis.

6. Threaded bolt according to claim 5, wherein said central axis is spaced from the cylindrical surface of said second distal portion in a direction perpendicular to said shank longitudinal direction.

7. Threaded bolt according to claim 2, wherein said conical surfaces form part of a truncated cone, said outermost distal end being formed by an end plane.

8. Threaded bolt according to claim 7, wherein said end plane extends perpendicular to said shank longitudinal axis.

9. Threaded bolt according to claim 8, wherein said end plane is circular.

10. Threaded bolt according to claim 8, wherein in distal end view the boundary of said end plane coincides at least in one location with the boundary of said cylindrical surface of said second distal portion.

11. Threaded bolt according to claim 8, wherein in distal end view the boundary of said end plane is radially inwardly spaced from the boundary of said cylindrical surface of said second distal portion.

12. Threaded bolt according to claim 8, wherein a first measurement plane extending perpendicular to said shank longitudinal axis has been formed on said proximal head and, said end plane being formed as a second measurement plane extending parallel to said first measurement plane, said first and said second measurement planes being for use in ultrasonic length measurement for determining the tension in the threaded bolt after it has been placed in a connection.

13. Threaded bolt according to claim 12, wherein said first and said second measurement planes have a plane parallelism of at least 0,05 mm.

14. Threaded bolt according to claim 12, wherein said first measurement plane is located concentric with respect to said shank longitudinal axis and said second measurement plane is located eccentric with respect to said shank longitudinal axis.

15. Threaded bolt according to claim 13, wherein said second measurement plans is located radially aside of said shank longitudinal axis.

16. Threaded bolt according to claim 12, wherein said first measurement plane has been arranged without final or second processing operation.

17. Threaded bolt according to claim 12, wherein said second measurement plane has been arranged without final or second processing operation.

18. Threaded bolt according to claim 12, wherein said first measurement plane at the head end is located recessed.

19. Threaded bolt according to claim 1, wherein said second distal portion has a diameter that is larger than the inner diameter of the groove of the thread on the shank and smaller than the outer diameter of the groove of the thread on the shank.

20. Threaded bolt according to claim 1, wherein said outermost distal end is entirely located on one side of the central axis of the shank.

21. Threaded bolt according to claim 1, wherein said eccentricity of the outermost distal end is equal to at least one fourth of the diameter of the shank.

22. Thread according to claim 1, wherein said first distal portion, at least at one side thereof, has surface areas of which the generatrix coincides with the generatrix of surfaces of the threaded bolt lying in front of them in proximal direction.

23. Threaded bolt according to claim 1, wherein said second distal portion connects to the thread of the shank in proximal direction.

24. Threaded bolt according to claim 1, wherein said thread of the shank, in the area near the distal portion, is locally interrupted and in which the shank in the same area has been provided with a recess.

25. Threaded bolt according to claim 1, wherein the generatrix and the shank longitudinal axis include an angle within the range of 30 to 60 degrees.

26. Threaded bolt according to claim 25, wherein the generatrix and the shank longitudinal axis include an angle of about 45 degrees.

* * * * *